United States Patent [19]
Tanaka et al.

[11] Patent Number: 5,291,561
[45] Date of Patent: Mar. 1, 1994

[54] GRAPHICS PROCESSING DEVICE

[75] Inventors: Yutaka Tanaka; Naruto Takasaki, both of Yokohama, Japan

[73] Assignee: Hitachi Software Engineering Co., Ltd., Kanagawa, Japan

[21] Appl. No.: 610,104

[22] Filed: Nov. 7, 1990

[30] Foreign Application Priority Data

Nov. 8, 1989 [JP] Japan ................... 1-291749

[51] Int. Cl.$^5$ .............................. G06K 9/00
[52] U.S. Cl. ......................... 382/8; 382/22; 382/25; 395/117
[58] Field of Search ................ 382/8, 10, 25, 26, 22, 382/5; 395/100, 105, 109, 117

[56] References Cited

U.S. PATENT DOCUMENTS

| | | | |
|---|---|---|---|
| 4,933,865 | 6/1990 | Yamamoto et al. | 382/25 |
| 4,944,021 | 7/1990 | Hoshino et al. | 382/5 |
| 4,947,442 | 8/1990 | Tanaka et al. | 382/5 |
| 5,065,439 | 11/1991 | Takasaki et al. | 382/25 |
| 5,105,467 | 4/1992 | Kim et al. | 382/5 |
| 5,109,428 | 4/1992 | Igaki et al. | 382/5 |

*Primary Examiner*—Joseph Mancuso
*Attorney, Agent, or Firm*—Fay, Sharpe, Beall, Fagan, Minnich & McKee

[57] ABSTRACT

A graphics processing device has an image data storing unit for storing image data, a graphic data storing unit for storing graphic data, a coordinate inputting unit for inputting coordinates, a display unit for displaying the image data and the graphic data, and a graphic operation processing unit for processing the image data and the graphic data. The graphic data are processed with reference to the image data displayed on the display unit by designating a control point. The designation of the control point is made to allow its image characteristic point recognizing section to set a predetermined region in the neighborhood of an input point inputted for the graphic operation, to recognize a shape of an image in the predetermined region, decide a characteristic point of the image corresponding to the shape of the image recognized, and to deliver the characteristic point of the image as the control point to a control point inputting unit.

9 Claims, 5 Drawing Sheets

F I G. 2a
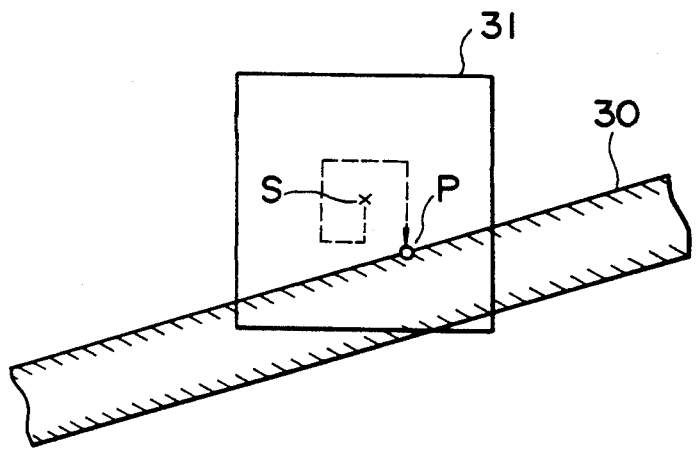
F I G. 2b
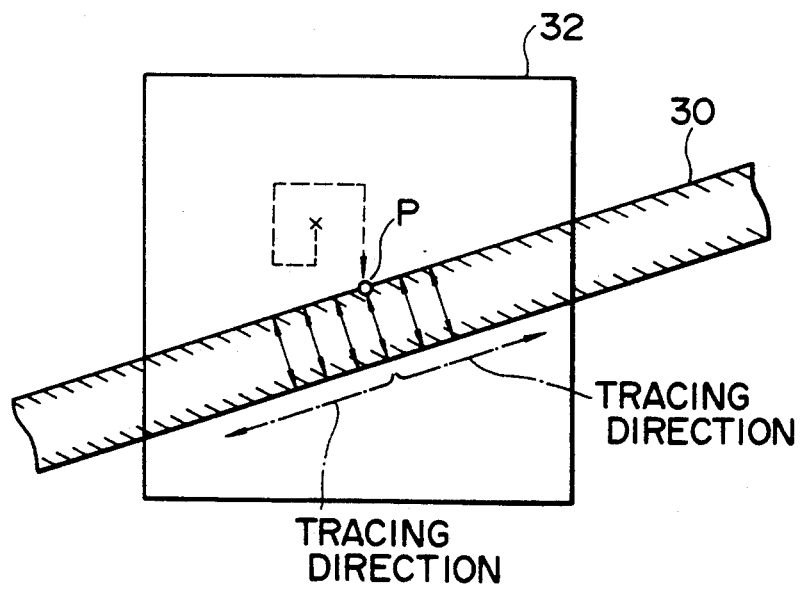

GRAPHICS PROCESSING DEVICE

BACKGROUND OF THE INVENTION

The present invention relates to a graphics processing device and, more particularly, to a graphics processing device, such as a computer-aided design (CAD) device or the like, having an additional function of recognizing and extracting a characteristic point of an image to be referenced for the graphic operation to be carried out by a graphic operation processing function.

Heretofore, pictures drawn on paper have been inputted into a graphics processing system as image data by means of an image scanner or the like. The image data are then displayed on a display screen through the graphics processing system and the operator has manually inputted through a pointing device or the like by tracing the image data on the screen.

For example, Japanese Patent Unexamined Publication (Kokai) No. 62-269,276/1987 discloses an interactive graphics input system in which a picture is scanned by an image scanner and inputted into a computer as image data, which in turn are displayed on a display screen while superposing center line image data on the image data. The graphics are input as vector data by designating the positions required for the graphics on the display screen by means of a coordinate designator.

In converting the image data into the graphics data (coordinate points data) such as vector data, for example, in the manner as described hereinabove, the center data for the center or center line of the image are first given, and then necessary data such as an end point, branch point or corner point as the characteristic point of the image are selected from the center data, and such necessary data are inputted. In this case, in the conventional technique, the characteristic points have been inputted while the center data are superposed on the image data on the display screen. Hence, the display screen is forced to become so complicated that the operator has failed to select necessary data in an efficient way.

For instance, in the conventional technique, when the image data are converted into vector data as the graphic data for the characteristic point of a transversely lying, inverted L-shaped linear graphic form as shown in FIG. 5, the center point data 51 are first given from the image data 50 and, while both the center point data 51 and the image data 50 are displayed on the screen, the corner point 52 is selected from the center point data as the characteristic point and the graphic data are inputted by designating the corner point 52 as the characteristic point of the image.

As described hereinabove, however, the conventional graphics operation method in which the graphics data (vector data) are inputted requires the picture to be inputted as the image data to thereby give the center point data, followed by manually selecting the corner point 52 on the display screen in order to designate the characteristic point. Hence, the operation should be carried out twice in order to obtain the graphics data so that this operation for obtaining the graphics data is quite complicated. Further, the inputting is implemented manually so that the characteristic points may not ways be designated in an accurate fashion, and thus the graphics data inputted may cause an error.

SUMMARY OF THE INVENTION

Therefore, it is an object of the present invention to provide a graphics processing device having an additional graphic operation processing function, such additional function being capable of recognizing and extracting an appropriate characteristic point of a reference image in the neighborhood of an input point to be inputted for the graphic operation.

In order to achieve the aforesaid object, the present invention consists of a graphics processing device comprising an image data storing unit for storing image data; a graphic data storing unit for storing graphic data; a coordinate inputting unit for inputting coordinates; a display unit for displaying the image data and the graphic data; and a graphic operation processing unit for processing the image data and the graphic data; wherein the graphic data are processed with reference to the image data displayed on the display unit by designating a control point; and further comprising:

an image characteristic point recognizing unit for setting a predetermined region in the neighborhood of an input point to be inputted for the graphic operation, recognizing a shape of an image in the predetermined region, deciding a characteristic point of the image corresponding to the shape of the image recognized, and delivering the characteristic point of the image as the control point to a control point inputting unit.

The graphic operation processing unit of the graphics processor comprises a graphic operating section for manipulating the image data and the graphic data, a control point inputting section for inputting the control point for the graphic operation, and an image characteristic point recognizing section for setting a predetermined region in the neighborhood of an input point inputted for the graphic operation, detecting an image point by scanning, recognizing a shape of the image in the predetermined region by tracing the image from the image point, extracting the characteristic point of the image determined by the shape of the image, and delivering the characteristic point of the image as the control point to the control point inputting section.

The image characteristic point recognizing section implements the setting of the predetermined region in the neighborhood of the input point inputted for the graphic operation, recognizes a shape of the image in the predetermined region, decides the characteristic point of the image corresponding to the shape of the image recognized, and delivers the characteristic point of the image as the control point to the control point inputting section.

More specifically, when the point is inputted by the coordinate inputting unit such as a coordinate inputting device or the like in order to give the control point, the predetermined region for the input point is set in the neighborhood of the input point and the image point is detected by scanning the image data in the predetermined region, followed by tracing the image from the image point, thereby recognizing the shape of the image in the predetermined region and extracting the characteristic point of the image determined by the shape of the image recognized. The characteristic point of the image is extracted by tracing the image points in the direction in which the image points are continuously disposed in a linear fashion. When a discontinuous point of the image points has been detected in tracing the image points in the predetermined region from the point in which the image point has first been detected, the discontinuous point is determined as the characteristic point for an end point. When there has been detected the point at which the continuous direction of the image is branched into plural directions, this point is determined as the characteristic point for a branch point. When there has been detected the point at which the continuous direction of the image is changed, this point is determined as the characteristic point for a corner point of the image.

In this case, the characteristic point of the image can be extracted by setting the predetermined region in the neighborhood of the input point, detecting the image point by scanning the image data in the predetermined region, and then tracing the image from the image point detected. However, in instances where no characteristic point can be detected as a result of tracing the image in the predetermined region, a center point which lies in the center of the line width of the image and in the position nearest the input point is determined as the characteristic point. The characteristic points so determined are delivered to the control point inputting section as the control point for carrying out the graphic operation.

With this arrangement, when the graphic data are processed on the basis of the image data, the graphics processor according to the present invention permits the characteristic point on the reference image to be accurately detected even if the designation of the control point would inaccurately be made, and also permits the characteristic point to be utilized as the control point without enlarging the display of a portion of the reference image, in other words, without shifting the display screen, whenever the control point is inputted. The graphics processor according to the present invention enables the operator to effectively carry out the graphic operation.

Other objects, features and advantages of the present invention will become apparent in the course of the description of the preferred embodiments, which follows, in conjunction with the accompanying drawings.

BRIEF DESCRIPTION OF THE DRAWINGS

FIGS. 2a and 2b are diagrammatic representations showing the processing operation of the image characteristic point recognizing section.

DETAILED DESCRIPTION OF THE PREFERRED EMBODIMENTS

Figure 1:
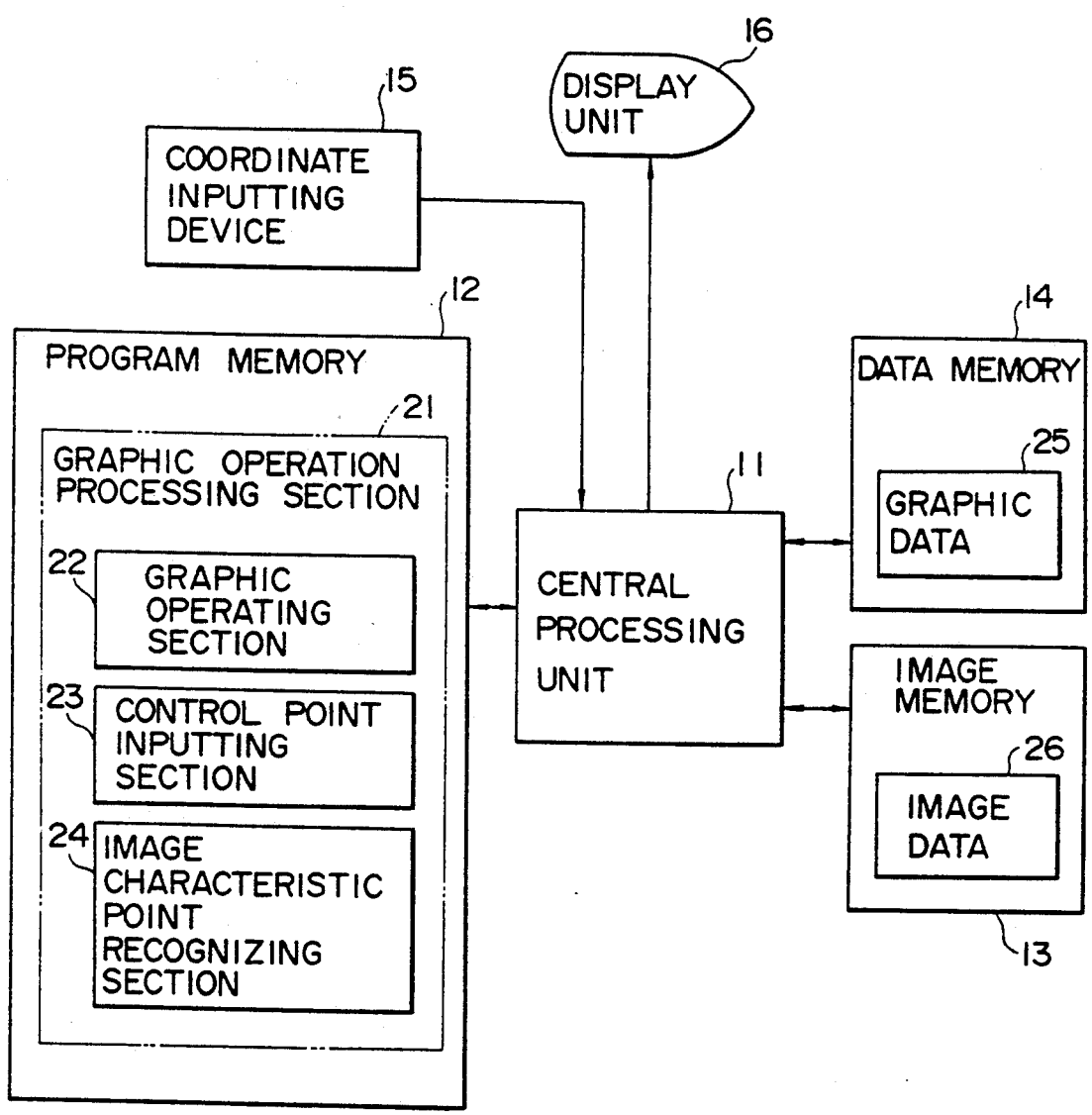
FIG. 1 is a block diagram illustrating the construction of the graphics processing device according to an embodiment of the present invention.

FIG. 1 illustrates the construction of a graphic processor according to an embodiment of the present invention. The graphic processor comprises a central processing unit 11 for implementing various processings, a program memory 12 for storing a program required for the processing to be implemented by the central processing unit 11, an image memory 13 for storing image data 26 to be referenced for graphic processing, a data memory 14 for storing graphic data 25 for the graphic processing, a coordinate inputting device 15 for inputting positions of coordinates required for the graphic operation, and a display unit 16 for displaying the image data 26 and the graphic data 25.

The program memory 12 stores the program for a graphic operation processing section 21 which implements a variety of graphic , operations, and the graphic operation processing section 21 comprises a graphic operating section 22, a control point inputting section 23, and an image characteristic point recognizing section 24. The central processing unit 11 implements the graphic operation on the basis of a program in the graphic operation processing section 21 of the program memory 12. The graphic operating section 22 is a basic processing section for implementing graphic operations such as, for example, graphic generation, delete, move, copy and so on. The control point inputting section 23 is a processing section for inputting a point (a control point) for the designation of a graphic, for example, when the graphic operation is carried out for graphic editing. The image characteristic point recognizing section 24 is designed to start the processing, trace an image point in a predetermined region of the image data 26, and extract the characteristic point of an image when it is decided, as a result of analysis of the kind of input point inputted due to the processing by the control point inputting section 23, that the input point is required to be replaced by the characteristic point of the image in the neighborhood of the input point, (for example, that the image data exist in a constant, predetermined range with the input point as a given center).

Description will now be made of the operation of the image characteristic point recognizing section 24 with reference to FIGS. 2a and 2b. In carrying out the graphic operation, the point required for the graphic operation is inputted into the central processing unit 11 from the coordinate inputting device 15 and, as a result, the central processing unit 11 allows the graphic operation processing section 21 to carry out the graphic operation. The processing by the image characteristic point recognizing section 24 is allowed to start when the kind of input point is analyzed by the control point inputting section 23 and it is decided as a result of analysis that the input point is to be replaced by the characteristic point of the image in the neighborhood of the input point, for example, when image data 30 exist in a square region 31 in a constant range with the input point S as the given center, as shown in FIG. 2a.

The processing by the image characteristic point recognizing section 24 comprises inputting the input point S, deciding to determine the existence of the image data 30 in the square region 31 in a constant range with the input point S as the given center as shown in FIG. 2a and, when it is decided that the image data 30 exist, detecting an image point P by scanning the image data in a spiral fashion from the input point S in the direction as indicated by the arrow expressed by broken lines in the drawing. Once the image point P is detected, a decision region range 32 is then set to lie in the square region in the constant range with the detected image point P as a given center, as shown in FIG. 2b. In this decision region range 32, the characteristic point of the image in the neighborhood of the input point S is decided. The characteristic point of the image is extracted by deciding a shape of the image in the decision region range 32. In such data processing, physically, the extract processing is implemented by processing the coordinate data of the input point in order, setting a predetermined region on the image data 26 stored in the image memory 13, detecting the decision of the shape of the image in this region, and recognize characteristic point of the image. After the extraction of the characteristic point, the central processing unit 11 returns the processing to the control point inputting section 23, and the extracted characteristic point is inputted as a control point, thereby carrying out the graphic operation based on the control point due to the processing by the graphic operating section 22. The result of a series of these processings is displayed on the display unit 16 and reflected in the graphic data 25 stored in the data memory 14.

Figure 3:
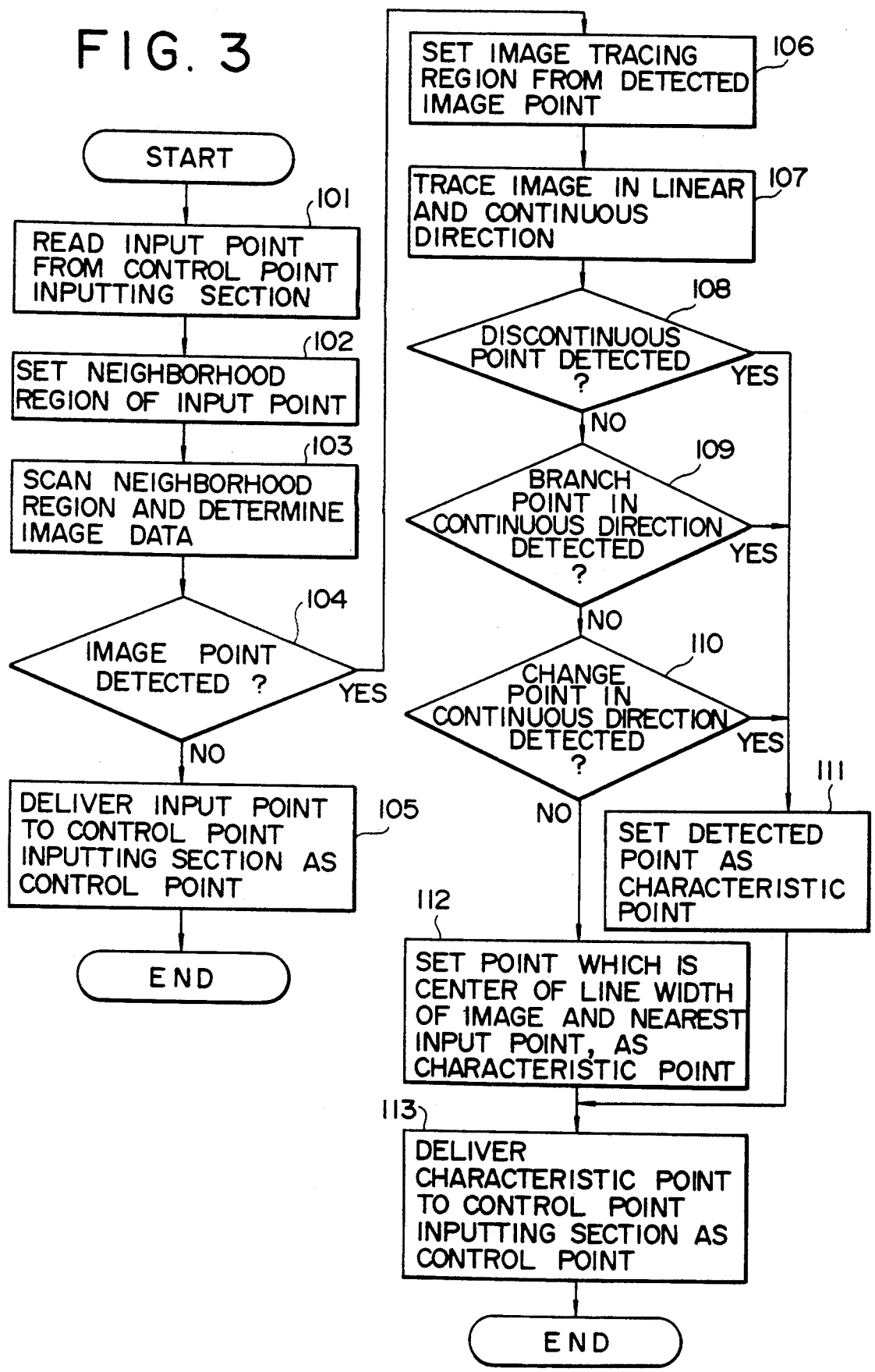
FIG. 3 is a flowchart showing the processing flow to be processed by the image characteristic point recognizing section.

FIG. 3 is a flowchart for the processing to be implemented by the image characteristic point recognizing section 24. Each of FIGS. 4a, 4b, 4c and 4d illustrates an example in which a different characteristic point of the image to be extracted is detected.

Description will be made of the image characteristic point recognition processing with reference to the processing flowchart of FIG. 3. Suppose that the input point S required for the graphic operation is inputted from the coordinate inputting device 15 through the control point inputting section 23 of the graphic operation processing unit 21. The central processing unit 11 allows the image characteristic point recognizing section 24 to implement the image characteristic point recognition processing on the basis of the coordinate data of the input point S. More specifically, at step 101, the input point S is read from the control point inputting section 23, followed by step 102 at which a neighborhood range of the input point S is set to lie in a constant range with the coordinates of the input point S as a given center from the image data 26 stored in the image memory 13. Then the program flow goes to step 103 at which the neighborhood range is scanned and the image point is decided. Then, at step 104, a decision is made to determine if the image point is detected. If the result of decision indicates that no image point P has been detected, on the one hand, the program flow advances to step 105 at which the processing is delivered to the control point inputting section 23 in order to make the input point S the control point, followed by the termination of the image characteristic point recognition processing.

When the result of decision at step 104 indicates that the image point P has been detected, on the other hand, the program flow goes to step 106 at which a trace decision range is set from the image point P. This trace decision range is set to correspond to a constant range in the square region with the detected image point P as a given center, as shown in FIG. 2b. Then the program flow proceeds to step 107 at which the image is traced in the continuously spiral direction in the trace decision range set at step 106. This trace is carried out at step 107 in the direction in which the image extends continuously in a linear fashion to both the left and the right with the image point as the given center. Then, the result of the trace is decided to determine the characteristic point.

Figure 4A:
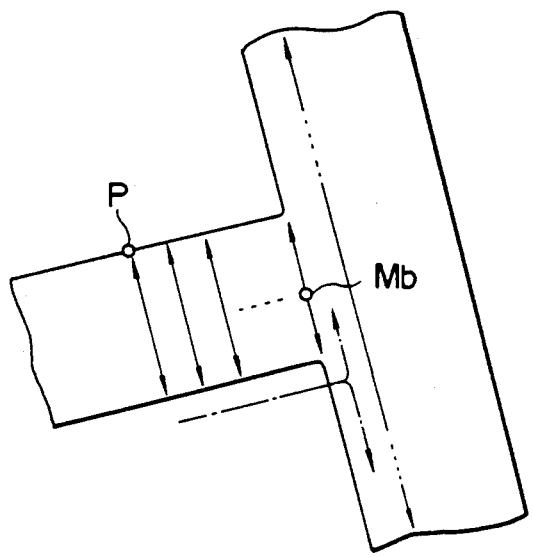
FIGS. 4a, 4b, 4c and 4d are diagrammatic representation showing examples for detecting the characteristic points of the different images to be extracted.
Figure 4B:
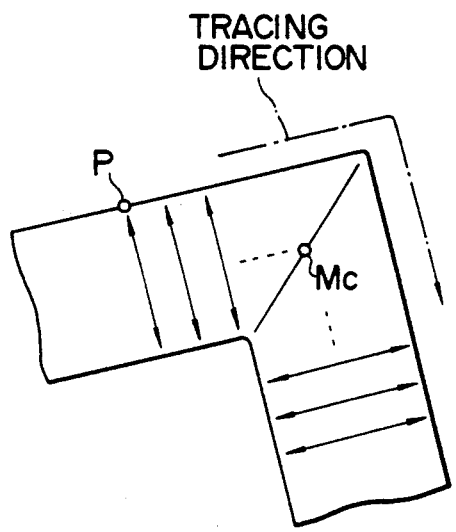
Figure 4C:
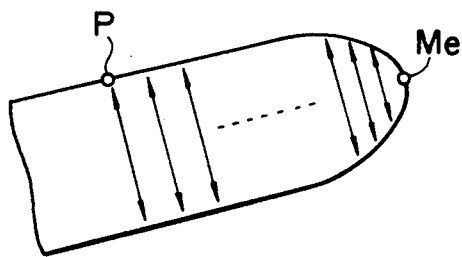
Figure 4D:
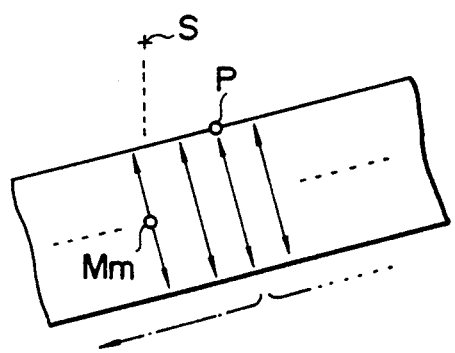
Figure 5:
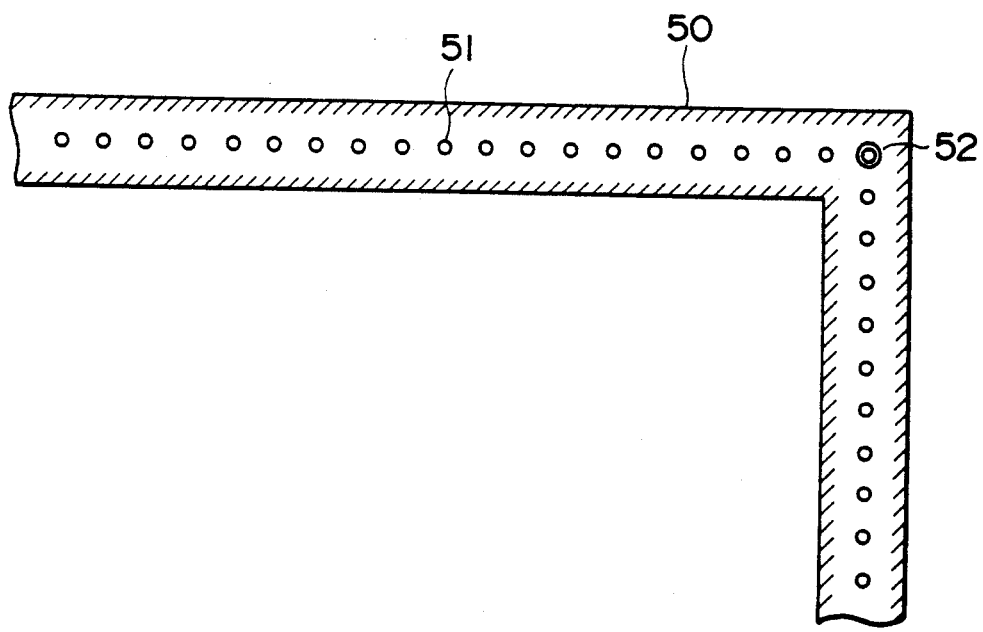
FIG. 5 is a diagrammatic representation showing an example for inputting the characteristic point of the image in a inconventional technique.

At step 108, a decision is made to determine if an end point Me has been detected, the end point Me being such that the direction of tracing the image becomes discontinuous as shown in FIG. 4c. If the result of decision at step 108 indicates that nb end point Me has been detected, on the one hand, the program flow goes to step 109 at which a decision is made to determine if there has been detected a branch point Mb at which the direction of tracing the image is branched as shown in FIG. 4a. When it is decided at step 109 that no branch point Mb has been detected, the program flow goes to step 110 at which a decision is further made to determine if there has been detected a corner point Mc at which the direction of tracing the image has changed. When the result of decision at step 110 indicates that no corner point Mc has been detected, then the program flow goes to step 112. As described hereinabove, if none of the characteristic points such as the end point Me, the branch point Mb, and the corner point Mc has been detected, then it is decided at step 112 to set a point Mm to the characteristic point, the point Mm lying on the center line between the line width of the image and in the position nearest to the input point S, as shown in FIG. 4d. Then, the flow proceeds to step 113.

When it is decided at step 108 that the end point Me at which the direction of tracing the image becomes discontinuous has been detected, then the program flow proceeds to step 111 at which the detected branch point Me is designated as the characteristic point. Likewise, when the result of decision at step 109 indicates that the branch point Mb has been detected, then the program flow goes to step 111 at which the branch point Mb is designated as the characteristic point. Furthermore, when it is decided at step 110 that the corner point Mc has been detected, then the program flow goes likewise to step 111 at which the corner point Mc is designated as the characteristic point. After step 111, the program flow goes to step 113, where the extracted characteristic point is delivered to the control point inputting section 23 in order to replace the input point S, the characteristic point is made the control point, and the image characteristic point recognition processing concludes.

In the embodiment of the present invention as described hereinabove, when the input point S has been inputted from the coordinate inputting device 15, an image region range is automatically set in the neighborhood of the input point S, and the characteristic point from the image in the image region range is recognized to thereby replace the input point S by the characteristic point and make this characteristic point the control point. Hence, the graphic operation can be carried out by acquiring an accurate control point even if the input point would be inaccurate, without enlarging a reference image for the graphic operation nor shifting a display screen of the display unit 16 with a limited display area only whenever the control point is inputted.

In summary, the graphic processing device as illustrated in the embodiment according to the present invention may be stated as follows:

1. In carrying out the graphic operation, a predetermined region in a constant range with the input point as the given center is defined as the neighborhood region of the input point which in turn is defined by the coordinates of the point inputted by the coordinate inputting device or the like.

2. In the neighborhood region so defined, the image data are then scanned from the input point to detect the image point.

3. By detecting the image point, a constant range with the detected image point as the given center is limited as a decision range for recognizing the characteristic point of the image, thereby determining an image data region of the image as the object for recognizing the characteristic point.

4. In the decision range so limited, the tracing of the image point starts from the detected image point, and the image points are traced in a continuously linear direction. The shape of the image is decided from the result of tracing the image points. In other words, the character of the image as a linear image is determined, thereby extract the characteristic point of the image.

5. When a discontinuous point of the image points has been detected in tracing the image points in the continuous direction, the discontinuous point is determined as the end point and this end point is set as the characteristic point of the image.

6. When a point has been detected at which the continuous direction of the image branches into plural branches, this point is determined as a branch point and this branch point is set as the characteristic point of the image.

7. When a point has been detected at which the continuous direction of the image is changed, this point is determined as a corner point and this corner point is set as the characteristic point of the image.

8. If neither an end point nor a branch point nor a corner point have been detected in the processing for extracting the characteristic point of the image, the characteristic point thereof is determined by an image line center point which lies in the center of the line width of the image and in the position nearest the input point.

9. Then, the characteristic point so determined replaces the input point and is delivered to the control point inputting section as the control point for carrying out the graphic operation. This control point can be used to accurately designate the particular characteristic point of the image data without enlarging the display of the image data functioning as reference data for the graphic operation.

Although the foregoing description is made of the present invention by way of embodiments, it is to be understood that the present invention is not restricted to those embodiments and encompasses various variations and modifications within the scope and spirit of the present invention.

As described hereinabove, the graphic processing device according to the present invention does not require a portion of the reference image to be enlarged whenever the control point is inputted in carrying out the graphic operation in conjunction with the reference image. Hence, the characteristic point on the reference image can accurately be detected even on the basis of the inaccurate designation of the control point without shifting the display screen whenever the control point is inputted and, as a result, the characteristic point of the image can be utilized as the control point. This allows the operator to shorten the time required for the graphic operation to a considerable extent.

What is claimed is:

1. A graphics processing device, comprising:
   an image data storing unit for storing image data;
   a graphic data storing unit for storing graphic data;
   a coordinate inputting unit for inputting coordinates;
   a display unit for displaying the image data and the graphic data;
   a graphic operation processing unit for processing the image data and the graphic data, the graphic data being processed with reference to the image data displayed on the display unit by designating a control point; and
   an image characteristic point recognizing unit for setting a predetermined region in the neighborhood of an input point inputted for the graphic operation, recognizing a shape of an image in the predetermined region, deciding a characteristic point of the image corresponding to the shape of the image recognized, and outputting the characteristic point of the image as the control point.

2. A graphics processing device as claimed in claim 1, wherein the input point inputted by the coordinate inputting unit is designated on a display screen of the display unit on which the image data re displayed.

3. A graphics processing device as claimed in claim 1, wherein the graphic operation processing unit comprises a graphic operating section for manipulating the image data and the graphic data; a control point inputting section for receiving the control point outputted from the image characteristic point recognizing unit for graphic operation; and the image characteristic point recognizing unit; and
   wherein the image characteristic point recognizing unit determines an image tracing point from the input point, recognizes the shape of the image int he predetermined region by tracing the image from the image tracing point, and outputs the characteristic point of the image as the control point to the control point inputting section.

4. A graphics processing device as claimed in claim 3, wherein the characteristic point of the image to be extracted from the recognized shape of the image is one of an end point, a branch point and a corner point.

5. A graphics processing device as claimed in claim 3, wherein the characteristic point of the image to be extracted from the recognized shape of the image is an end point determined by a discontinuous point of a plurality of image points that constitute the image in the predetermined region which is detected in a constant range of the predetermined region from a position at which the image tracing point has been determined for the first time as a result of tracing the plurality of image points in a direction in which the plurality of image points are continuously disposed in a linear form.

6. A graphics processing device as claimed in claim 3, wherein the characteristic point of the image to be extracted from the recognized shape of the image is a branch point determined by one point of a plurality of image points that constitute the image int he predetermined region, the one point being detected in a position in which a continuous direction of the image is branched into plural directions as a result of tracing the plurality of image points in a direction in which the plurality of image points are continuously disposed in a linear form.

7. A graphics processing device as claimed in claim 3, wherein the characteristic point of the image to be extracted from the recognized shape of the image is a corner position determined b one point of a plurality of image points that constitute the image in the predetermined region, the one point being detected in a position in which a continuous direction of the image is changed as a result of tracing the plurality of image points in a direction in which the plurality of image points are continuously disposed in linear form.

8. A graphics processing device as claimed in claim 3, wherein the characteristic point of the image to be extracted from the recognized shape of the image is a center point determined by one point of a plurality of image points that constitute the image in the predetermined region, the one point being located in the center of a line width of the image and in a position nearest to the input point when the characteristic point of the image to be extracted from the shape of the image recognized is determined by none of an end point, a branch point nor a corner point of the image.

9. A method for recognizing a characteristic point of an image for a graphics processing device having an image data storing unit for storing image data; a graphic data storing unit for storing graphic data; a coordinate inputting unit for inputting coordinates; a display unit for displaying the image data and the graphic data; and a graphic operation processing unit for processing the image data and the graphic data; wherein the graphic data are processed with reference to the image data displayed on the display unit by designating a control point; comprising the steps of:

designating an input point corresponding to the displayed image;

defining a predetermined neighborhood region in the neighborhood of the input point in a constant range with the input point as a given center of the neighborhood region;

scanning from the input point in the defied neighborhood region and thereby detecting an image tracing point;

restricting the constant range, with the image tracing point detected as a given center, as a decision range in which a characteristic point of the image is recognized, and determining an image data region for the image as an object whose characteristic point is to be recognized;

tracing the image points that constitute the image in the decision range beginning from the detected image tracing point and proceeding in a direction in which the image points are continuously and linearly disposed, and determining the shape of the image in the decision range from the result of tracing;

determining whether a discontinuous end point of the image exists in the decision range as the characteristic point of the image as a result of tracing the image points in the direction in which the image points are continuously disposed in a linear form;

determining whether a branch point exists, at which a continuous direction of the image in the decision range is branched into plural directions, as the characteristic point of the image as a result of tracing the image points in the direction in which the image points are continuously disposed in a linear form;

determining whether a corner point exists, at which a continuous direction of the image in the decision range is changed, as the characteristic point of the image as a result of tracing the image points in the direction in which the image points are continuously disposed in a linear form;

determining a center point, which lies in a center position in a line width of the image in the decision range and in a position nearest to the input point, as the characteristic point of the image when none of an end point, a branch point nor a corner point is detected as a result of tracing the image points in the direction in which the image points are continuously disposed in a linear form; and p1 substituting the given characteristic point for the input point.

* * * * *